United States Patent [19]

Corkery et al.

[11] 3,801,405

[45] Apr. 2, 1974

[54] METHOD OF WELDING THERMOPLASTICS TO PREVENT WARPING

[75] Inventors: Gregory O'C. Corkery; Raymond A. Diehl, both of St. Louis, Mo.

[73] Assignee: Arundale Manufacturers, Inc., St. Louis, Mo.

[22] Filed: Mar. 1, 1971

[21] Appl. No.: 122,585

[52] U.S. Cl. ............... 156/306, 156/212, 156/220, 156/290, 161/113, 161/114, 161/123, 161/131, 161/160, 264/345
[51] Int. Cl. ........ C09j 5/00, B32b 3/24, B32b 5/18
[58] Field of Search .......... 156/212, 220, 290, 306; 161/113, 114, 123, 131, 160; 264/345; 29/448, 449

[56] References Cited
UNITED STATES PATENTS

| | | | |
|---|---|---|---|
| 3,292,619 | 12/1966 | Egler | 128/156 |
| 3,503,838 | 3/1970 | Marshack | 161/120 |
| 3,530,023 | 9/1970 | Schutte et al. | 156/290 |

Primary Examiner—Alfred L. Leavitt
Assistant Examiner—Robert A. Dawson
Attorney, Agent, or Firm—Rogers, Ezell & Eilers

[57] ABSTRACT

This invention relates to a method of welding a porous flexible sheet material to a thermoplastic frame structure, the sheet material having a melting point above that of the thermoplastic frame such as certain types of synthetic cloths, plastic foam, wire screen and the like. The sheet is made to overlie the frame and a selected portion of the frame surface contacting the sheet material heated to its melting temperature to weld the frame to the sheet. Simultaneously with the application of the weld heat, a balancing heat is applied to a selected portion of the frame creating balancing stresses in the frame members and preventing warping thereof, the balancing heat preferably being less than that required to melt the thermoplastic frame.

10 Claims, 6 Drawing Figures

INVENTORS
GREGORY O'C. CORKERY
RAYMOND A. DIEHL
BY Rogers, Ezell, Eilers & Robbins
THEIR ATTORNEYS

METHOD OF WELDING THERMOPLASTICS TO PREVENT WARPING

BACKGROUND OF THE INVENTION

Welding would be an ideal technique for use in the manufacture of certain types of thermoplastic articles were it not for the warping caused by stresses created in the article as the weld cools. An example of such an article is a thermoplastic filter which generally includes a solid thermoplastic frame with a sheet of filter material, such as plastic foam, overlying the frame, the plastic foam having a higher melting temperature than the thermoplastic frame.

Preferably, the filter sheet could be bonded to the frame by heating the frame surface adjacent the sheet to a melting temperature, thereby welding the sheet to the frame. Unfortunately, however, the resultant warpage of the frame members makes the welding technique unsatisfactory in the manufacture of such articles. For this reason, such articles are usually manufactured by molding the frame with the peripheral edge of the filter sheet embedded therein, requiring precise alignment of the sheet material in the mold before the plastic is injected, and precise control of mold pressure to prevent excessive pinching of the bat material while at the same time preventing excessive flash.

SUMMARY OF THE INVENTION

This invention provides a method of welding for use in the manufacture of such articles, while solving the warping problem. A flexible sheet material having a melting temperature higher than that of the thermoplastic frame is placed so that it overlies the frame. A quantity of heat sufficient to melt the thermoplastic is applied to a predetermined surface area of the frame just beneath the overlying sheet, forming a continuous molten bead of thermoplastic between the frame and sheet. This molten bead fills the interstices of the sheet near the frame surface and cools to bond the sheet to the frame.

If the process included nothing more, the stresses created in the solidifying bead would produce bending moments about the neutral axes of the frame members, causing them to warp. In accordance with this invention, warping is prevented by heating, to a predetermined temperature below the melting point of the thermoplastic, second frame areas of predetermined sizes and locations to produce a bending moment equal and opposite to that produced in the curing weld, thus preventing the frame from warping. Preferably the balancing heat is applied simultaneously with the weld heat.

DETAILED DESCRIPTION OF THE DRAWING

DETAILED DESCRIPTION OF A PREFERRED EMBODIMENT

Figure 1:
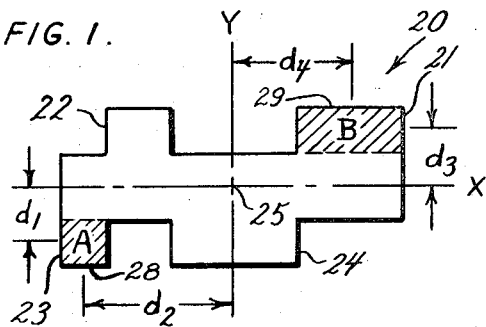
FIGS. 1 and 2 are cross sections of typical members used in explaining the theory of this invention.

A complex mathematical analysis of the theory of this invention is unnecessary, however, the basic theory will be developed using simplified formulas in reference to FIG. 1 of the drawing.

A material such as thermoplastic tends to shrink as it cools from a liquid state. If it can't shrink due to physical restraints acting thereon, stresses are created within the cooled volume of the material.

Thus, referring to FIG. 1 of the drawing there is shown a cross section of a thermoplastic member 20 of constant cross section having portions 21, 22, 23, and 24. The horizontal neutral plane of the member 20 is shown by the X-axis and the vertical neutral plane by the Y-axis. The neutral axis 25 of the member 20 is the line of intersection between the horizontal and vertical neutral planes. The cross sectional area of the portion 23 is A and the cross sectional area of the portion 21 is B.

If the portion 23 is heated to a sufficiently high temperature, whether that temperature is above or below the melting point of the thermoplastic, and allowed to cool, it will tend to shrink. However, because it is restrained by its connection to the remaining portions of the member 20, stresses are created during the cooling period which produce a bending moment about the X-axis approximately as follows:

$$M_X = [T_M - T_2]\rho E A d_1;$$

and about the Y-axis approximately as follows:

$$M_Y = [T_1 - T_2]\rho E A d_1;$$

where $\rho$ is the coefficient of thermo expansion of the thermoplastic, E is the modulus of elasticity of the thermoplastic, A is the cross sectional area of the member 23, $d_1$ is the distance from the centroid of area A to the X-axis, $d_2$ is the distance from the centroid of the area A to the Y-axis, $T_1$ is the temperature to which the portion 23 is heated, and $T_2$ is the final temperature of the portion 23 after it has cooled which is the final temperature of the entire member 20.

If the portion 21 is heated to a sufficiently high temperature and allowed to cool, stresses are created within the portion 21 just as with the portion 23, which stresses also create bending moments about the X and Y axes. These moments act in opposition to those created during the cooling of the portion 23. The bending moments created in the portion 21 about the X and Y-axes are given approximately as follows:

$$M_X = [T_3 - T_2]\rho E B d_3;  \text{and}$$

$$M_Y = [T_3 - T_2]\rho E B d_4;$$

where $\rho$, E, and $T_2$ are as heretofore defined, B is the cross-sectional area of the portion 21, $d_3$ is the distance from the centroid of the area B to the X-axis, $d_4$ is the distance from the centroid of the area B to the Y-axis, and $T_3$ is the temperature to which the portion 21 is heated.

Therefore, for the bending moment about the X-axis created by cooling the portion 21 to equal the bending moment about X-axis created by cooling the portion 23, the following conditions must be met:

$$Ad_1[T_1 - T_2] = Bd_3[T_3 - T_2];$$

and for the bending moment about the Y-axis created by the cooling of the portion 21, to equal the bending moment about the Y-axis created by cooling the portion 23, the following conditions must be met:

$$Ad_2[T_1-T_2] = Bd_4[T_3-T_2]$$

Thus, it is only necessary to select the appropriate size and location of the area B and the temperature $T_3$ to balance the moments created by cooling the portion 23.

As stated above these formulas are not meant to be exact but rather represent simplified approximations. For example, the coefficient of thermo expansion $\rho$ and the modulus of elasticity E are shown as constants whereas in fact they are not; furthermore, the entire portion 23 is assumed to be at a constant temperature whereas in fact there are temperature gradients throughout.

Applying these principals to the practical application of welding, suppose that the portion 23 is heated to a temperature $T_1$ that is the melting temperature of the thermo-plastic to create a weld. To balance the bending moments created as the portion 23 cools, one or more members on the opposite side of the neutral axes of selected sizes, such as the portion 21, is heated to a temperature just below the melting point of the thermoplastic. While it is certainly possible to heat the portion 21 to its melting point, this is undesirable in many applications as it would destroy the appearance of the article.

Because the portion 21 is heated to a lower temperature than the portion 23, one or more of the other parameters in the equation relating to the portion 21 must be made greater to maintain the above relationships. Therefore, a balancing member is selected that is either at a greater distance from the neutral axis than the portion 23 or has a larger cross sectional area.

Referring to FIG. 1 of the drawing, it can be seen that the cross sectional area B of the portion 21 is considerably larger than the cross sectional area A of the portion 23 so that temperature $T_3$ to which the portion 21 is heated, and which creates the condition for the balancing moment, is somewhat less than the melting temperature $T_1$ of the thermoplastic.

In practice, the portion 23 is heated to its melting temperature $T_1$ by applying heat directly to the surface 28, and the portion 21 is heated to the temperature $T_3$ by applying heat directly to the surface 29. By trial and error, the temperature $T_3$ is varied until a weld is produced without creating bending moments or warping. In this regard, the surface area 29 should be selected large enough to allow for the upward adjustment of $T_3$ so as not to melt the thermoplastic. This is a consideration that must be taken into account in the design of the frame member. If the surface area of the balancing portion is too small, it will be impossible to balance the bending moments by heating the balancing portion to a temperature below its melting point.

Figure 2:
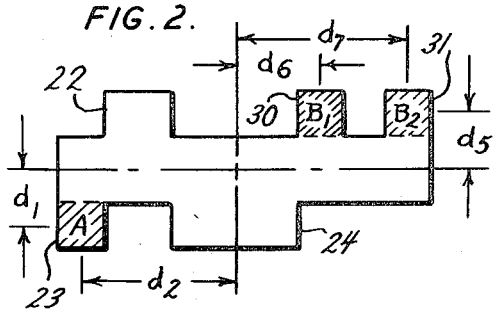

While the invention has thus far been described with heat applied to two opposing portions, obviously any number of welds can be made and any number of portions can be heated to balance the bending moments produced by the welds, as long as the resultant moment about the neutral axis is zero. For example, FIG. 2 of the drawing shows the cross section of a member similar to the member 20, but instead of a single balancing portion 21 having a cross-sectional area B, there are two balancing portions 30 and 31 having cross-sectional areas $B_1$ and $B_2$, respectively. The balancing conditions are as follows:

For X-axis $Ad_1(T_M-T_2) = B_1d_5(T_4-T_2) + B_2d_5(T_5-T_2)$

For Y-axis $Ad_2(T_M-T_2) = B_1d_6(T_4-T_2) + B_2d_7(T_5-T_2)$ where $A$, $d_1$, $d_2$, $T_M$, $T_2$, $B_1$ and $B_2$ are as heretofore defined, $T_4$ is the temperature to which the portion 30 is heated, $T_5$ is the temperature to which the portion 31 is heated, $d_5$ is the distance from the centroid of the areas $B_1$ and $B_2$ to the X-axis, $d_6$ is the distance from the centroid of the area $B_1$ to the Y-axis, and $d_7$ is the distance from the centroid of the area $B_2$ to the Y-axis.

Figure 3:
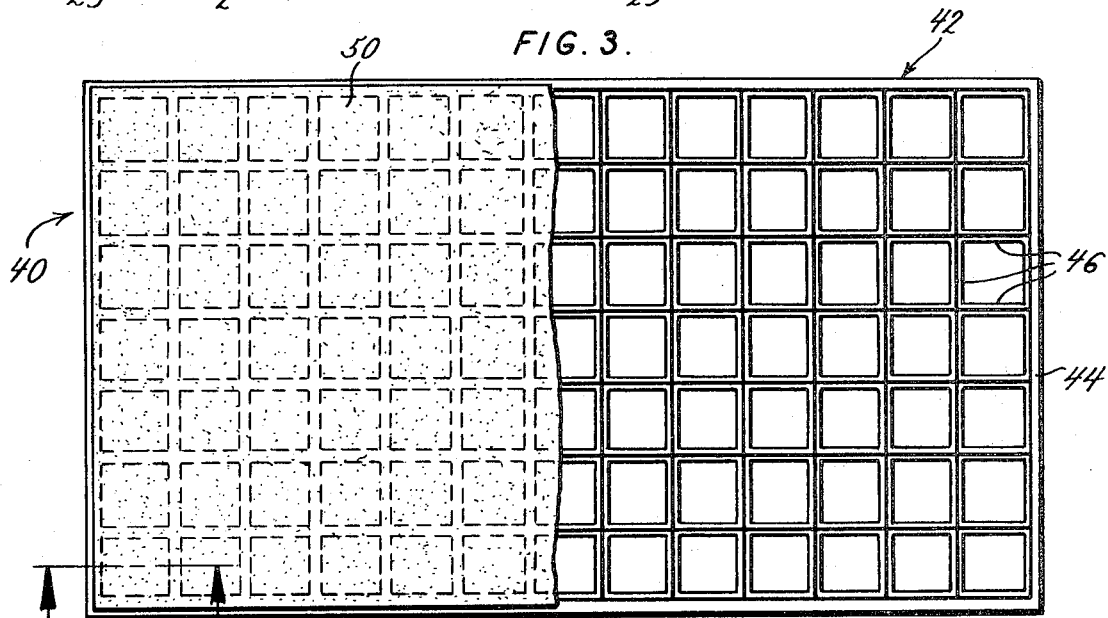
FIG. 3 is a plan view of an article produced by the method of this invention with parts broken away to show the frame members.
Figure 4:
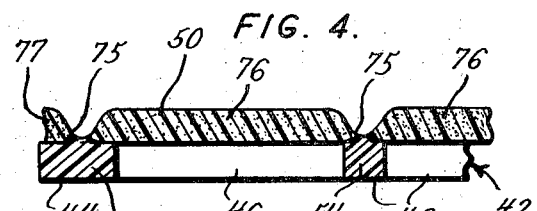
FIG. 4 is a view in section taken along the line 4—4 of FIG. 3.
Figure 5:
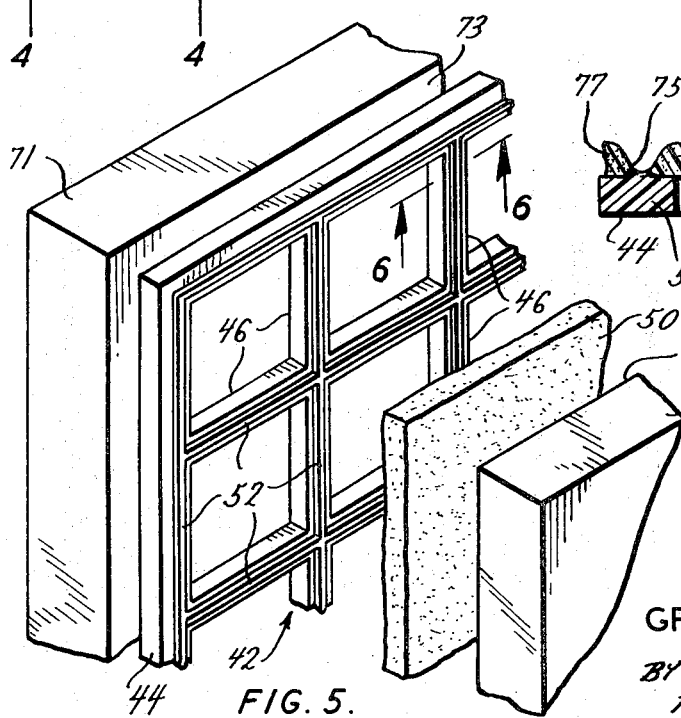
FIG. 5 is an illustration of the process of this invention as used in producing the article of FIG. 3.
Figure 6:
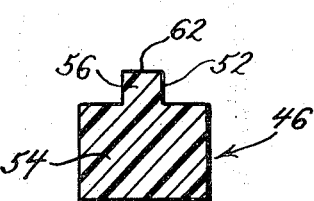
FIG. 6 is a view in section taken along the line 6—6 of FIG. 5.

In FIGS. 3, 4, and 6, there is shown an article produced by the method of this invention, and in FIG. 5 there is illustrated the process for producing the article in accordance with this invention. The article described is an example of the multitude of products that can be made by this method.

There is shown a filter element 40 for use in filtering impurities from the air. Such a filter, for example, might be used in clothes driers for filtering lint from the air. The filter element 40 includes a frame 42 of molded thermoplastic such as polypropylene, the frame including border members 44 and cross members 46, and a sheet 50 of foam material such as polyurethane overlying the frame 42, the sheet material having a higher melting point than the frame material. A narrow welding rib 52 is located at the top and extends the entire length of each frame member.

FIG. 6 is a cross section of a typical cross member 46 showing a relatively large rectangular area 54 which ultimately defines the cross section of the frame member after the filter sheet 50 is welded to the frame 42 and a relatively small square area 56 representing the cross section of the welding rib 52. It should be noted that the bottom surface 60 of the frame member is considerably greater in area than the top surface 62 of the weld rib 52. A typical cross section of the border members 44 is very similar to the cross section shown in FIG. 6 except that the base portion 54 is wider to strengthen the filter element.

FIG. 5 illustrates an embodiment of the process of this invention for manufacturing the final filter element 40 shown in FIG. 4, the form of which will be described in more detail, from the frame 42 and foam sheet 50. There are shown heat plates 70 and 71 having parallel heat surfaces 72 and 73, respectively. The frame 42 is positioned between the plates 70 and 71 with the back surfaces 60 of the frame 42 facing the heat surface 73, and the foam sheet 50 is positioned between the frame 42 and the plate 70. The temperature of the heat surface 72 is such that with the portion of the foam sheet held compressed between the weld surfaces 62 of the weld ribs 52, for a predetermined length of time which is preferably only a few seconds, sufficient heat from the heat surface 72 penetrates the compressed foam to melt substantially the entire weld rib 52 without melting the remaining portions of the frame members, and without melting the foam sheet.

While it is impossible to melt exactly 100 percent of the rib 52 without melting any of the remaining portions of the members, the temperature of the surface 72 can be adjusted to come very close to achieving this result. Hence, the temperature to which the rib 52 is heated is its melting temperature, or $T_1$ as heretofore defined.

The temperature of the heat surface 73 is such that upon direct contact with the surfaces 60 of the frame 42, for the same length of time as the weld heat is applied, the back portions of the frame are heated to a temperature below the melting point of the thermoplastic frame, but sufficiently high to create bending moments in the frame equal and opposite to those created by melting the weld ribs 52, these moments actually being created as the frame cools. Because the area of the surfaces 60 is considerably greater than the area of the surfaces 62, the balanced condition can be achieved by heating the surfaces 60 to below their melting point as seen from the equations heretofore described.

With the plates 70 and 71, the frame 42, and foam sheet 50 so positioned, and the surfaces 72 and 73 at the temperatures described, the surfaces 72 and 73 are brought toward one another until the surface 73 contacts the back surfaces 60 of the frame 42, and the foam sheet 50 is compressed between the surfaces 62 of the weld ribs 52 and the surface 72 of the plate 70. The plates 70 and 71 are held in this closed position the predetermined length of time, i.e., that necessary to melt the rib 52 and heat the back portions of the frame to the balancing temperature at the temperatures of the heating surfaces 72 and 73. During this time the heat from the plate 70 penetrates the compressed foam to melt the rib 52, the molten thermoplastic filling the interstices of the compressed foam. The heat from the plate 71 heats the back portion of the frame 42 to a temperature below its melting point to create the balancing moments heretofore described. The surfaces 72 and 73 are then separated from contact with the filter element, and the molten plastic allowed to solidify to create the weld.

In practice, the heating surface temperatures, and the relationship between them should be such that the proper amounts of weld and balancing heat are applied simultaneously and for an equal time of only a few seconds, as this has been found to be the most efficient application of the process of this invention. However, it is to be understood that the weld and balancing heats could be applied separately and for different lengths of time.

Also, while the temperature of the surface 73 that creates the balancing moments in the frame 42, and the lengths of time the weld and balancing heats are applied could be calculated, in practice they are determined empirically. Using as an example, the embodiment of the invention described where the weld and balancing heats are applied simultaneously and for the same length of time, the weld temperature is set to melt the rib 52 in a predetermined length of time. The temperature of the heat surface 73 is set to some arbitrary amount and a filter element produced, the balancing heat also being applied the same length of time. The temperature of the surface 73 is adjusted up or down as necessary each time producing a filter element, until one is produced without warpage, at which time the variables of the process are set for mass production of the filter elements.

As a specific example, if the weld rib 52 is one thirty-second of an inch square, in cross section, the portion 54 of the frame members is three sixteenths of an inch square in cross section, the entire member is made of polypropylene thermoplastic, the surface 72 is heated to a temperature of approximately 450°F, and the surface 73 is heated to a temperature of approximately 300°F, the filter element 40 can be produced without warpage by holding the plates 70 and 71 closed as heretofore described for approximately 10 seconds.

A cross section of the finished filter element is shown in FIG. 4. The large portions 54 of the frame members are substantially the same as before welding; however, the weld ribs 52, which were melted during welding, are shorter and wider. The foam sheet 50 is compressed at portions 75 where the rib 52 has filled the interstices of the foam, but is non-compressed at portions 76 between the frame members 46 and at portions 77 outside the ribs 52 of the boarder members 44.

Therefore, there has been described a method of welding thermoplastic materials while preventing them from warping.

Various changes and modifications may be made within this invention as will be readily apparent to those skilled in the art. Such changes and modifications are within the scope and teaching of this invention as defined by the claims appended hereto.

What is claimed is:

1. A method of welding a flexible, porous, sheet material to a rigid thermoplastic frame member and preventing warping of the member, the sheet material having a melting point higher than that of the thermoplastic member comprising the steps of laying the sheet over selected welding surfaces of the member, heating a selected first volume of the member of which the welding surfaces are a part to its melting temperature causing the molten thermoplastic of the melted first volume to fill at least some of the interstices of the sheet above the welding surfaces to weld the sheet to the member when the molten plastic re-solidifies, and heating at least one selected second volume of the member to a temperature sufficient to create bending moments in the member equal and opposite to those created from melting the first volume, thereby preventing warpage of the member.

2. The method of claim 1 wherein the location and size of the second volume are selected such that the heating of the second volume to a temperature below its melting point creates bending moments equal and opposite to those created by melting the first volume.

3. The method of claim 2 wherein the second volume is selected to be larger than the first volume.

4. The method of claim 1 wherein the first and second volumes are heated simultaneously.

5. The method of claim 1 wherein heat is applied to the first and second volumes for the same length of time.

6. The method of claim 1 wherein the flexible porous sheet material is a foam material and the portions of the foam material above the welding surfaces are held compressed against the welding surfaces as the first volume is melted.

7. The method of claim 1 wherein the first volume is heated by applying heat through the sheet material to the welding surfaces, and the second volume is heated by applying heat directly to surfaces of the second volume.

8. The method of claim 7 wherein the welding surfaces and surfaces of the second volume are on diametrically opposite sides of the neutral axes of the member.

9. A method of producing a thermoplastic article including a flexible, porous, sheet material welded on a rigid thermoplastic frame having one or more frame members, without producing warpage in the article, the sheet material having a melting point higher than that of the thermoplastic member, comprising the steps of laying the sheet over selected welding surfaces of the member, heating a selected first volume of the member of which the welding surfaces are a part to its melting temperature causing the molten thermoplastic of the melted first volume to fill at least some of the interstices of the sheet above the welding surfaces to weld the sheet to the member when the molten plastic cures, heating at least one selected second volume of the member to a selected temperature below its melting point, the second volume selected to be larger than the first volume, allowing the first and second volumes to cool to ambient temperature, thereafter repeating these steps to produce successive articles each time varying the temperature to which the second volume is heated below its melting point as necessary until an article is produced without warpage.

10. An article produced by the method of claim 1.

* * * * *